(12) United States Patent
Trovato et al.

(10) Patent No.: US 7,131,134 B2
(45) Date of Patent: Oct. 31, 2006

(54) EVENING PLANNER

(75) Inventors: Karen I. Trovato, Putnam Valley, NY (US); James D. Schaffer, Wappingers Falls, NY (US); Kaushal Kurapati, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1181 days.

(21) Appl. No.: 09/850,755

(22) Filed: May 8, 2001

(65) Prior Publication Data
US 2004/0216168 A1    Oct. 28, 2004

(51) Int. Cl.
G06F 3/00    (2006.01)
G06F 13/00    (2006.01)
H04N 5/445    (2006.01)

(52) U.S. Cl. .............................. 725/46; 725/44; 725/47
(58) Field of Classification Search ............. 725/9–21, 725/44–47, 39; 719/318; 706/12, 14, 46
See application file for complete search history.

(56) References Cited

U.S. PATENT DOCUMENTS

| | | | | |
|---|---|---|---|---|
| 6,088,722 | A * | 7/2000 | Herz et al. | 725/46 |
| 6,851,090 | B1 * | 2/2005 | Gutta et al. | 715/716 |
| 7,017,172 | B1 * | 3/2006 | Schaffer et al. | 725/46 |
| 2002/0082901 | A1 * | 6/2002 | Dunning et al. | 705/10 |
| 2002/0108113 | A1 * | 8/2002 | Schaffer et al. | 725/46 |
| 2002/0116713 | A1 * | 8/2002 | Mukai et al. | 725/58 |
| 2002/0174429 | A1 * | 11/2002 | Gutta et al. | 725/46 |
| 2003/0061183 | A1 * | 3/2003 | Schaffer et al. | 706/8 |
| 2003/0061202 | A1 * | 3/2003 | Coleman | 707/3 |
| 2003/0067554 | A1 * | 4/2003 | Klarfeld et al. | 725/46 |

FOREIGN PATENT DOCUMENTS

| | | |
|---|---|---|
| EP | 0 774 868 | 5/1997 |
| EP | 0 854 645 | 7/1998 |
| EP | 0 673 583 | 8/1999 |
| EP | 0 673 582 | 3/2000 |
| GB | 2 340 635 | 2/2000 |
| GB | 2 340 636 | 2/2000 |
| GB | 2 340 638 | 2/2000 |
| WO | WO99/01984 | 1/1999 |

* cited by examiner

*Primary Examiner*—John Miller
(74) *Attorney, Agent, or Firm*—Aaron Waxler; Paul Im

(57) ABSTRACT

An apparatus and method for recommending a schedule of events to a user is disclosed. In the preferred embodiment of the system and method, each channel schedule is broken down into time slices. A novel fuzzy-now recommendation-time value is calculated for each time slice. This fuzzy-now recommendation-time value is a two dimensional value measured in units of recommendation-time, or "enjoyment minutes". By means of the calculated fuzzy-now recommendation-time values, recommended schedules may be generated using a wide variety of selection methods.

23 Claims, 16 Drawing Sheets

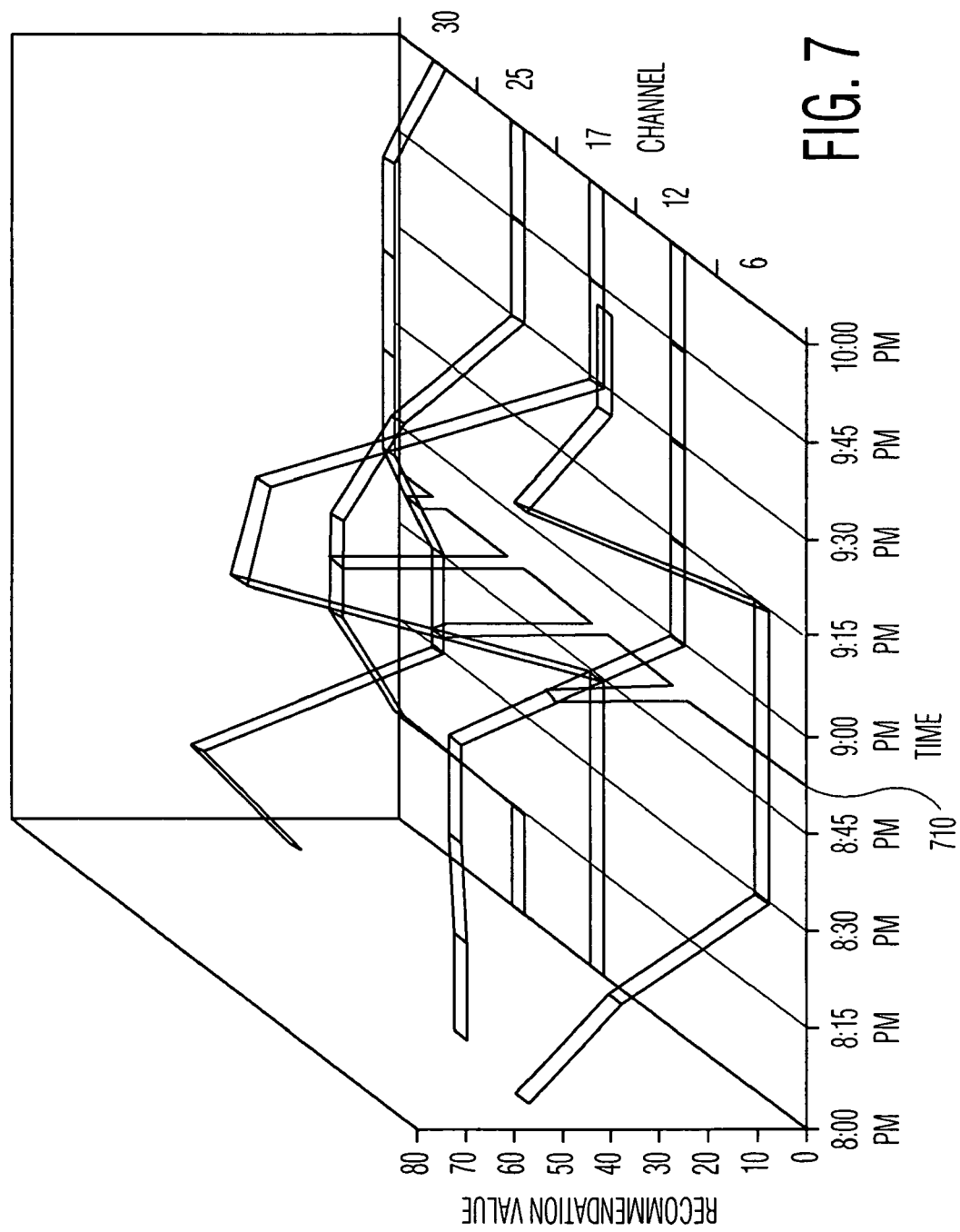

EVENING PLANNER

BACKGROUND OF THE INVENTION

1. Field of the Invention

This invention relates generally to media entertainment systems which use Electronic Program Guides (EPGs), and, more specifically, to a system and method of generating, for a particular time period, a suggested schedule of media presentations.

2. Description of the Related Art

An Electronic Program Guide (EPG) provides a visual display of media programming schedule information. Such media programming includes, but is not limited to, television shows (cable or broadcast), radio shows, and Webcasts (multicasts over the Internet). Typically, the media programming displayed is shown in real-time, i.e. the scheduling information shown is taking place currently or in the near future.

An exemplary EPG Graphical User Interface (GUI) is shown in FIG. 1. A timeline broken down into half-hour blocks is at reference numeral 101, and the programming for five different channels or stations is shown as horizontal strips at reference numerals 111–115. The user may use an input/ouput (I/O) device to select a particular block in order to see more information regarding the event (i.e., a discrete item of media presentation on a channel, such as a TV or radio show) indicated by that block. In FIG. 1, block 120 has been selected, as shown by its darker outline. Because it has been selected, descriptive information concerning the event in block 120 is shown at the top of the GUI at reference numeral 130. Preview display 130 may contain images and video as well as text to describe the event. The GUI in FIG. 1 only shows one segment of the programming schedule: specifically, the events on channels (or stations or websites) 2, 3, 4, 5, and 6 from time 8:00 to 9:30 p.m. In order to see other channels, the user may scroll up or down using the vertical scroll bar 140 and, in order to see different times, the user may scroll forward in time or backward in time using horizontal scroll bar 150.

The EPG GUI has been described independently of any particular medium or output device because the concept of an EPG GUI is likewise independent of any particular medium or display device. However, a block diagram of the relevant functional modules in a conventional media entertainment system that employs an EPG GUI will now be described with reference to FIG. 2. A media source 210 provides content through communication means 215. Examples of a media source include, but are not limited to, a cable TV (CATV) system, a broadcast television system, the Internet, or a storage/playback device (VCR, DVD player, CD-ROM player, a hard drive, a solid-state memory storage unit, etc.). Each media source may have many channels or just one channel. Although communication means 215 is shown as a system bus in FIG. 2, it is merely for ease of presentation and does not represent the actual implementation of communication means 215. The system bus representation may describe one embodiment, where the different units are connected by a local area network (LAN). However, in other embodiments, there might be point-to-point connections between elements (with no shared broadcast medium) or a combination of separate networked and point-to-point connections. For example, a CATV system (Media Source 210) may have a point-to-point connection by coaxial cable with Receiver/Tuner 220 ("point-to-point" from the viewpoint of the individual Receiver/Tuner 220, not the viewpoint of the CATV system), whereas Receiver/Tuner 220, Controller 230, and output means 250 may all be connected by the interior wiring of a TV set. Examples of the one or more connections making up the communication means 215 include, but are not limited to, coaxial cable, terrestrial RF transmission, optical fiber, satellite microwave transmission, telephone network, local area network (LAN), etc. For purposes of this block diagram, media source 210 may comprise multiple media sources and the communication means 215 may comprise multiple communication means.

Receiver/Tuner 220 receives the media content by communication means 215 and transmits one or more channels to output means 250. Examples of a receiver/tuner include, but are not limited to, a stereo AM/FM receiver, a television UHF/VHF broadcast receiver embedded in a television set, a set-top box (STB) attached to a CATV cable line, a web browser, etc. A web browser is appropriate in this context because a web browser "tunes in" a particular URL (Uniform Resource Locator) to receive media content, such as streaming real-time video. Furthermore, a web browser may be implemented in a PC (Personal Computer), a PDA (Personal Digital Assistant), a mobile terminal (e.g. a WAP-enabled cellular telephone), or any device with a network connection and a processor. A channel may be a "web channel" or the output of a television station, a radio station, or a computer server. Examples of output content on a channel include, but are not limited to, shows, movies, real-time audio/video feed, news text, graphics, images, etc. Examples of output means include, but are not limited to, a television monitor, a stereo speaker system, a holographic display, a screen on a PDA or mobile device, etc.

A controller 230 controls receiver/tuner 220 to select channels to be output on output means 250 and may control other components in FIG. 2, depending on the particular system involved. Controller 230 may comprise one or more processors, may be integrated with receiver/tuner 220, and may be able to perform the steps of a program. Such a program may be stored in Storage 280 or embedded in the controller itself (e.g. the controller is an Application Specific Integrated Circuit (ASIC) chip). Storage 280 is in FIG. 2 for ease of description, and does not necessarily represent hardware. Because controller 230 may require different items stored, such as BIOS, programs, and data, Storage 280 is in FIG. 2 to symbolically represent the one or more locations where these items are stored. Storage 280 may be located remotely (e.g., near Media Source 210), locally (near output means 250), or broken up and distributed both locally and remotely. Storage 280 may be solid-state (SDRAM, flash memory, etc.), magnetic (hard drive, tape, etc.), or optic (CD-ROM, DVD, etc.) memory.

A Scheduling Information Source 260 provides scheduling information for the EPG that is generated for output means 250. In practice, the Scheduling Information Source 260 may be integral with the Media Source 210, e.g., scheduling data may be sent along with the channels in the form of an additional channel or as data multiplexed with individual channels. However, the Scheduling Information Source 260 may be a stand-alone server on the Internet or plugged into a CATV system. By contrast, the Scheduling Information Source 260 may also be multiple distributed information sources or downloaded locally from a portable storage means, such as a floppy disk. The scheduling information that is sent from the Scheduling Information Source 260 may be formatted for output on the output means 250, or may be unformatted, in which case the controller 230 would oversee the formatting of the scheduling information. Furthermore, the scheduling information may be continually broadcast or downloaded using a request/reply protocol, where the controller would request particular scheduling information as the occasion arose and the Scheduling Information Source 260 would reply with that particular scheduling information. Such a protocol might be used if the Scheduling Information Source 260 is implemented as multiple distributed information sources.

User Profile(s) Storage 270 stores records for one or more users who use output means 250. Each user profile record contains preference information regarding one or more users. Examples of preference information include, but are not limited to, preferred genre (e.g., horror, romance, westerns, etc.), preferred actor(s), preferred sports teams(s), scheduling information not to be shown (e.g., a parent might restrict a child's EPG not to show the schedules of R-rated material), preferred shows, relative standings of preferred shows, and preferred keywords (e.g., for words that show up in the descriptive information). These preferences may be entered manually by the one or more users or compiled over time by monitoring the one or more users. The User Profile(s) Storage 270 may be stored locally or remotely.

The functional module description of FIG. 2 effectively encompasses the wide variety of media presentation implementations to which the present invention is directed. As an example, the functional module description can equally be applied to an embodiment comprised of a television set connected to a CATV system, an embodiment comprised of a digital radio receiver attached to a satellite dish, and an embodiment comprised of a PC connected to the Internet, as well as a variety of other embodiments.

One improvement to this type of media system is the addition of Recommendation System 290, which suggest different channel events to the user. Recommendation System 290 may base its recommendations on generic recommendations (for any audience), such as the "Best Bets" of a newspaper, or on specific recommendations for a group or individual. Recommendation System 290 may be implemented locally, e.g., as a program run through Controller 230, or remotely, e.g. as a function performed at Media Source 210. Specific recommendations made to groups or individuals by Recommendation System 290 may be based on individual or group user preferences (either determined by preference monitoring or by direct preference input of the user or group). Exemplary recommendation values for different events on different channels are shown in Table 1. As an example, the event $E_3$ on channel 32, which is scheduled for transmission from 9:00 to 9:30, has a recommendation value of 60 out of 100. The event in the 7:30–8:00 time slot that would be recommended to a user is event $E_1$ on channel 44 because it has the highest recommendation value (69).

TABLE 1

| | | Recommendation Values | |
|---|---|---|---|
| Channel | Event | Scheduled Time | Recommendation Value |
| 32 | $E_1$ | 7:30–8:00 | 25 |
| | $E_2$ | 8:00–9:00 | 50 |
| | $E_3$ | 9:00–9:30 | 60 |
| | $E_4$ | 9:30–10:00 | 27 |
| | $E_5$ | 10:00–11:00 | 71 |
| 44 | $E_1$ | 7:30–8:00 | 69 |
| | $E_2$ | 8:00–9:00 | 50 |
| | $E_3$ | 9:00–11:30 | 59 |
| 78 | $E_1$ | 7:30–8:00 | 10 |
| | $E_2$ | 8:00–9:00 | 40 |
| | $E_3$ | 9:00–9:30 | 83 |
| | $E_4$ | 9:30–10:00 | 50 |

TABLE 1-continued

| | | Recommendation Values | |
|---|---|---|---|
| Channel | Event | Scheduled Time | Recommendation Value |
| | $E_5$ | 10:00–11:00 | 66 |

One recommendation system is described in a patent application entitled THREE-WAY MEDIA RECOMMENDATION METHOD AND SYSTEM (U.S. application Ser. No. 09/627,139), which is hereby incorporated by reference. In that system, a preference engine and processing system is used to combine three different profiles in order to generate recommendation values for each event. The three different profiles are an explicit rule profile, a feedback profile (preferences indicated by user), and a history profile (preferences indicated by past viewing history). The explicit profile can make stand-alone recommendations or be used to modify recommendations generated from the other profiles. Suitable mathematical forms are used to appropriately weigh different factors and/or profile recommendations.

The output of conventional recommendation systems is a one-dimensional value that does not change over time. In other words, the recommendation value of an event does not change before, during, or after the broadcast of the event. This is shown graphically in FIGS. 3A–3C where the recommendation values $R_{Ex}$ for the events $E_x$ in Table 1 are charted over time. In order to add more functionality to recommendation systems, as disclosed in the patent application entitled RECOMMENDER SYSTEM USING "FUZZY-NOW" FOR REAL-TIME EVENTS (U.S. application Ser. No. 09/730,676), which is hereby incorporated by reference, a Fuzzy-Now Function Module 295 is added.

The fuzzy-now function yields a weighting factor to be applied to current viewing recommendations. Because the function is based on time, the fuzzy-now function typically varies over time and that variation is typically related to the starting and ending times for an event. An exemplary and simple fuzzy-now function for an event is shown in FIG. 4. In FIG. 4, there is an event occurring over time period $(t_{end}-t_{start})$ with a starting time of $t_{start}$ and an ending time of $t_{end}$. There is also a waiting starting time of $t_{wait\_start}$, which is determined by subtracting threshold time $t_{threshold}$ from the $t_{start}$ of the event. The fuzzy-now function in FIG. 4 produces a weighting factor w for the event over time, with, for example, 1 being the most preferred and 0 being not preferred at all. In one aspect, the fuzzy-now function might be considered to represent the answer to the question: "how enjoyable is this program if I start watching it (or start waiting for it) now?". The assumption behind the fuzzy-now function of FIG. 4 is that the user prefers to see the start of an event and his or her interest wanes from that point onward, as indicated by slope 403. Slope 402 indicates the user's willingness to wait before the event begins. If it is before the waiting start time $t_{wait\_start}$, the user is not willing to wait at all. After waiting start time $t_{wait\_start}$, the user is increasingly willing to wait as the amount of remaining waiting time decreases. Another simple fuzzy-now function might have a plateau in slope 403 to indicate a continued and constant enjoyment level.

This is a simple fuzzy-now function because it merely has straight line slopes connecting key times of the event (the key times being $f(t_{start})=1$, $f(t_{end})=0$, and $f(t_{wait\_start})=0$). There may be far more complex fuzzy-now functions based on different assumptions. For example, the user may enjoy the final Jeopardy round of the Jeopardy television show more than the other Jeopardy rounds. Because the final Jeopardy round occurs roughly five minutes before the end, the peak of the fuzzy-now function for Jeopardy may occur there, rather than $t_{start}$. In the same vein, the user may be more interested in watching the end of sports events or the final climax of a movie rather than the beginning.

FIGS. 5A–5C show more complex fuzzy-now weighted functions $w=f_w(E_x)$ for the same events $E_x$ on the same channels and the same particular time period as FIGS. 3A–3C. It is unlikely that there would be as wide a disparity between fuzzy-now functions as is shown between the individual fuzzy-now functions in FIGS. 5A–5C; however, the variety of shapes makes it easier to understand the process. Furthermore, for convenience, the weighted functions in FIGS. 5A–5C only apply to the time period between the start time and the end time of the event, and not the waiting time before the event starts ($t_{start}-t_{threshold}=t_{wait\_start}$ in FIG. 4).

As an example of a more complex fuzzy-now function, event $E_1$ on channel 32 between 7:30 and 8:00 in FIG. 5A has a fuzzy-now weighted function $f_w(E_1)$ which shows increasing interest for the first 15 minutes of the event (510), and then a sustained plateau of interest during the last 15 minutes of the event (520). As another example, in FIG. 5B, event $E_2$ on channel 44 between 8:00 and 9:00 has a fuzzy-now weighted function $f_w(E_2)$ with a slowly decreasing interest curve 540. Because it is used to weight the recommendation values, the fuzzy-now function $w=f_w(E_x)$ varies between 0 and 1 (as shown by the y-axis in FIGS. 5A–5C) so that events will only have their total recommendation value when the fuzzy-now function is highest (w=1) and will have no recommendation value when the fuzzy-now function is lowest (w=0).

Lastly, FIGS. 6A–6C show the final recommendation functions $f_R(E_x)=f_w(E_x) \times R_{Ex}$ for each event on each channel of Table 1 and FIGS. 3 and 5. The recommendation function $f_R(E_x)$ (FIG. 6) of an event $E_x$ is calculated by applying (i.e., multiplying) the weighted fuzzy-now function $f_w(E_x)$ (FIG. 5) for that event $E_x$ to the recommendation value $R_{Ex}$ (FIG. 3) of that event $E_x$. For example, in FIG. 6A, the recommendation function $f_R(E_1)$ 625 of event $E_1$ on channel between 7:30 and 8:00 equals the recommendation value $R_{E1}=25$ (301 in FIG. 3A) multiplied by the fuzzy-now function $f_w(E_1)$ (501 in FIG. 5A). Thus, although the last fifteen minutes of event $E_1$ on channel 32 show the greatest amount of interest (520 in FIG. 5A), the recommendation value for $E_1$ is only 25 (301 in FIG. 3A), so those fifteen minutes have a final recommendation function value of 25 (625 in FIG. 6A).

As discussed above, these values and functions $f_R(E_x)$, $f_w(E_x)$, and $R_{Ex}$ may be reached in a myriad of ways: monitoring the user, receiving best bets from a media source, tracking interest over time, etc. In the discussion of the present invention below, the exact manner of generating the specific values and functions is not limited or defined in any way so that the present invention applies to any system or method of generating the specific values and functions $f_R(E_x)$, $f_w(E_x)$, and $R_{Ex}$.

The fuzzy-now recommender system, as disclosed in RECOMMENDER SYSTEM USING "FUZZY-NOW" FOR REAL-TIME EVENTS (U.S. application Ser. No. 09/730,676), relates the instantaneous recommendation values for all roughly contemporaneous events to the current time in order to determine the user's immediate preferences. In other words, although a time-varying function is used to calculate the recommendation values, only one-dimensional instantaneous values are used to make recommendations. A simple example of this is shown in FIG. 7. FIG. 7 shows the recommendation functions $f_R(E_x)$ of the events on five particular channels (6, 12, 17, 25, and 30) as they change over time. For convenience, it is assumed certain time periods on certain channels have no events. For instance, there are no events from 8:30 to 9:30 on channel 6, 9:00 to 10:00 on channel 12, 9:30 to 10:00 on channels 17 and 25, and 8:30 to 9:00 on channel 30. In reality, there would be events during these time periods, and the recommendation values of those events would overlap with the recommendation values of the succeeding or preceding event on the same channel, which would lead to a confusing graph.

A user, at time 8:53 p.m., indicated by line 710 in FIG. 7, asks the fuzzy-now recommendation system to supply him with recommendations. At the time of the request 710, the recommendation values for the event on channel 12 is 0.225; the event on channel 17 is 0.375; the event on channel 25, 0.38; and the event on channel 30, 0.05. The fizzy-now recommendation system would recommend the event on channel 25 because it has the highest current recommendation value (0.38).

However, this recommendation is best seen as a local recommendation, but not necessarily a global recommendation. In other words, although the event on channel 25 is the best recommendation at the instantaneous point 710 in time, this may change over time. In fact, in FIG. 7, the event on channel 25 maintains roughly the same recommendation value and then decreases over the next 47 minutes, whereas the event on channel 17 rapidly increases its recommendation value far above the event on channel 25 and remains higher for the remainder of the next 47 minutes. A global recommendation may be for the event on channel 17 rather than channel 25, regardless of the exact instantaneous recommendation value.

Therefore, there is a need for a system and method which can use the fuzzy-now recommendation functions to generate global recommendations. Such a fuzzy-now recommendation system would take into account future events, and how the recommendation values of events change subsequent to the current time. Because such a fuzzy-now recommendation would provide global recommendations, it would be uniquely suited for generating recommended schedules for users.

SUMMARY OF THE INVENTION

It is an object of the present invention to provide an improved recommendation system for media events in a media entertainment system.

It is another object of the present invention to provide a schedule recommendation system which will include in its recommendation assessments the fuzzy-now concept of time varying preferences for some or all events.

It is a further object of the present invention to provide a fuzzy-now schedule recommendation system that takes into account future events and how the recommendation values of events will change subsequent to the current time.

It is a further object of the present invention to provide a fuzzy-now schedule recommendation system that allows recommendation values to be recalculated based upon how the selection process has changed the remaining unselected events.

It is a still further object to provide a fuzzy-now schedule recommendation system that can plan an itinerary of media events using preference-time units, in such a manner that any selection procedure, algorithm, or method using preference-time units may be used.

These and other objects are achieved by an apparatus and method for recommending a schedule of events to a user, where the schedule has a start time and an end time. The apparatus comprises: a fuzz-now recommendation system for generating a fuzzy-now recommendation function for each event; a fuzzy-now recommendation-time value generator for calculating a fuzzy-now recommendation-time value for each time slice, where a time slice is a unit of time that each channel is divided into; and a selector for using the calculated fuzzy-now recommendation-time values of each time slice to select a series of events and partial events to comprise a schedule of recommended events.

The method of generating a schedule of recommended events comprises the steps of: receiving the schedules of events being presented on each channel from the start time to the end time; generating a fuzzy-now recommendation function for each event in each received schedule, thus creating a series of fuzzy-now recommendation functions for each channel; dividing each channel—each series of generated fuzzy-now recommendation functions—into time slices; calculating a fuzzy-now recommendation-time value for each time slice; and selecting, using the calculated fuzzy-now recommendation-time values, a series of events and partial events to comprise a schedule of recommended events.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 7 shows the fuzzy-now recommendation functions of five particular channels;

DETAILED DESCRIPTION OF THE PRESENTLY PREFERRED EMBODIMENTS

The present invention is directed to a system and method of making recommendations based on units of recommendation-time, or "enjoyment-minutes". As described above, prior art systems merely use a one dimensional recommendation value when making recommendation calculations. By contrast, the present invention uses recommendation values based on two-dimensional units of recommendation-time. These recommendation values of recommendation-time are formed by integrating the area under the fuzzy-now function curve, thus allowing an analysis of how a user enjoys an event over a time period.

Figure 1:
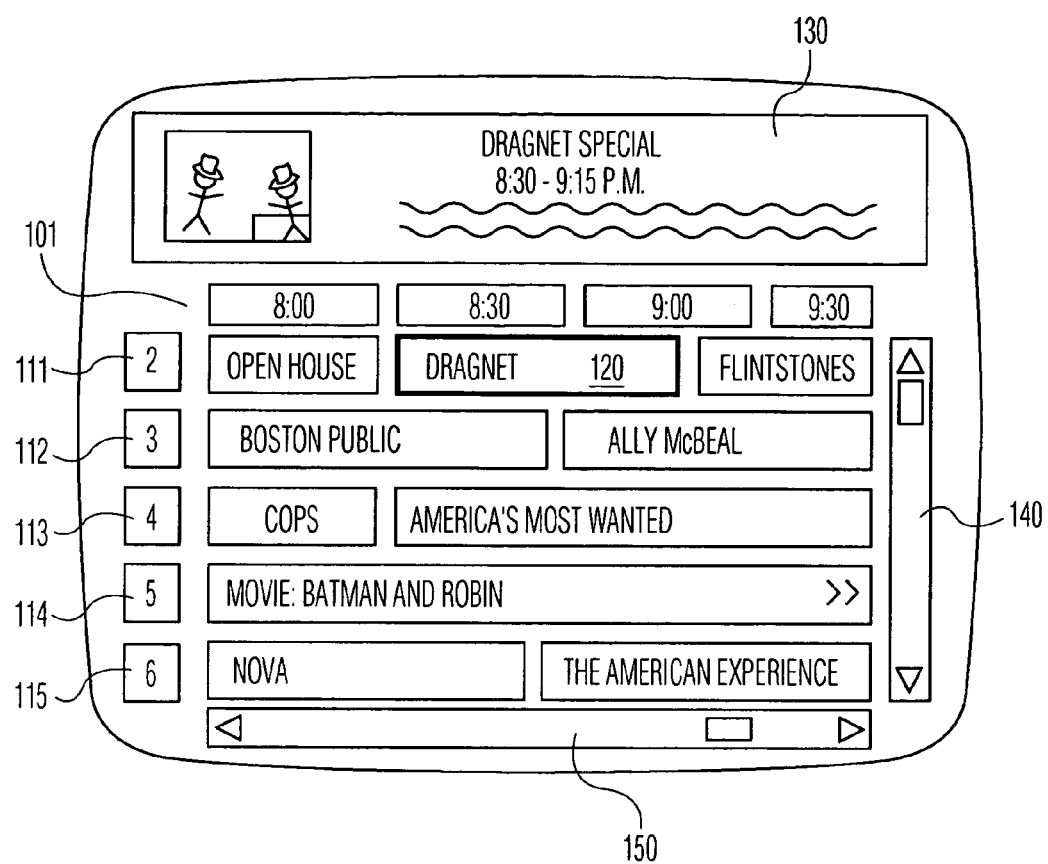
FIG. 1 is an exemplary conventional Electronic Programming Guide (EPG) Graphical User Interface (GUI)
Figure 2:
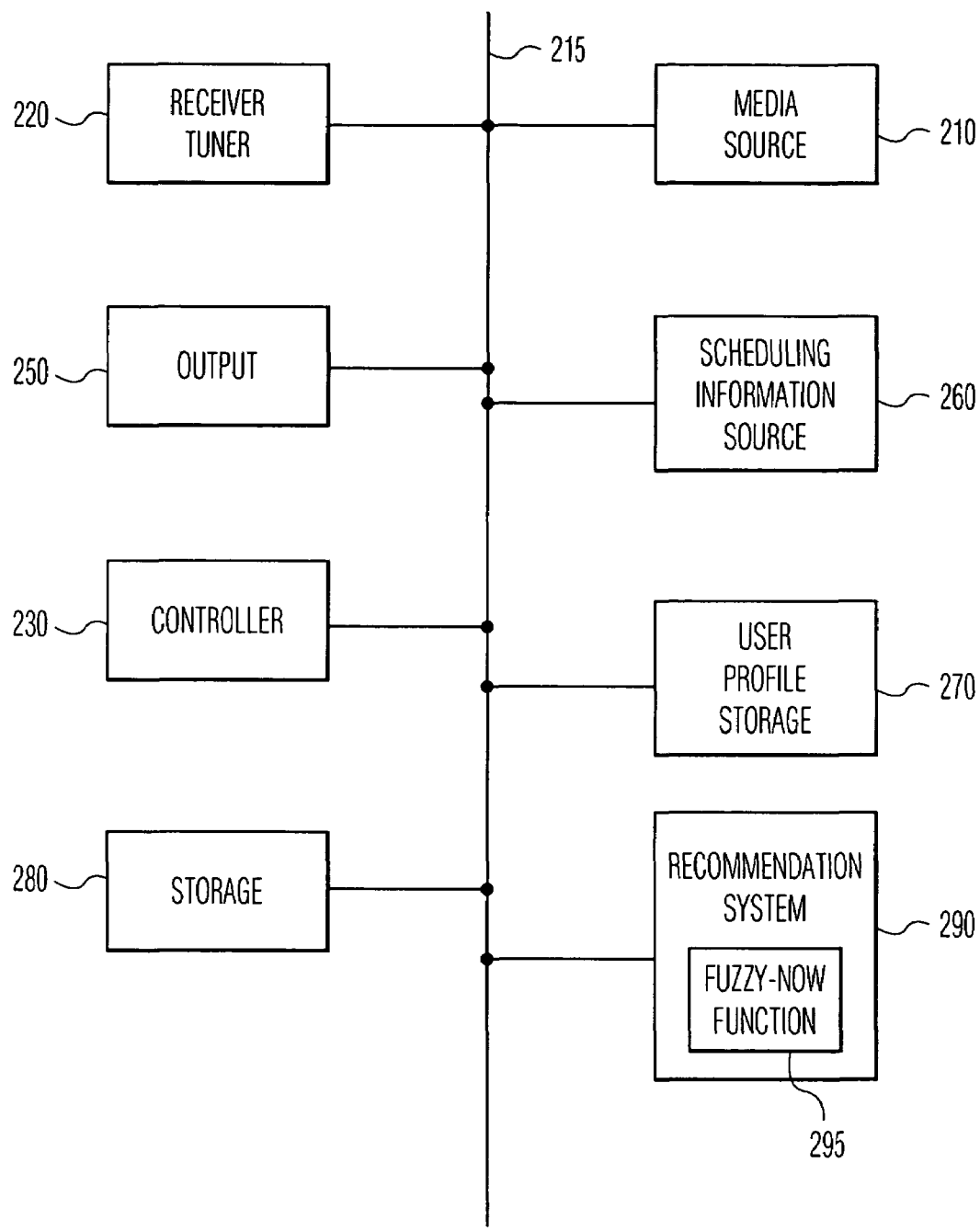
FIG. 2 is a block diagram of the relevant functional modules in a prior art media entertainment system that employs an EPG GUI.
Figure 3A:
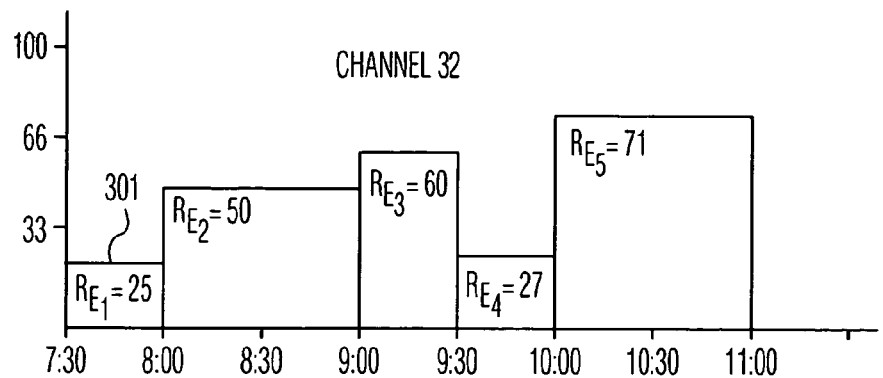
FIGS. 3A–3C are the recommendation values for events on three particular channels during a particular period of time.
Figure 3B:
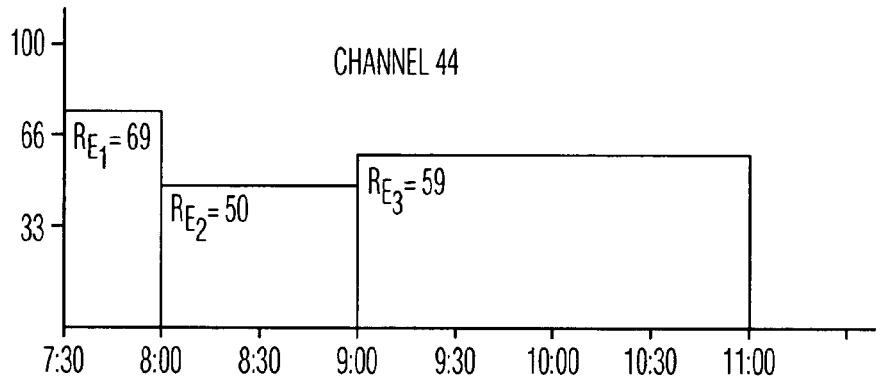
Figure 3C:
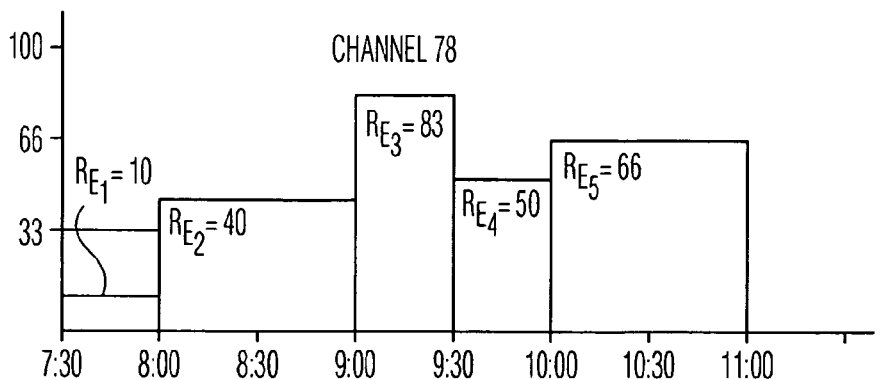
Figure 4:
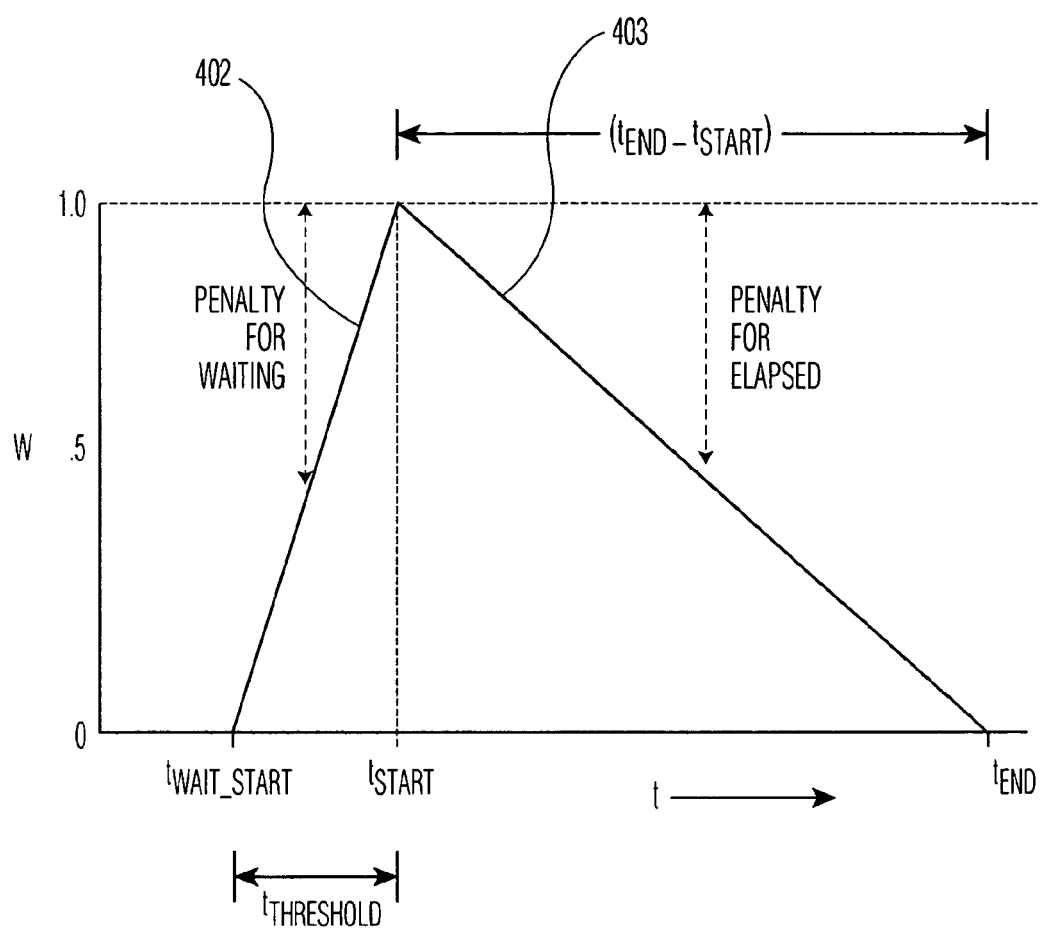
FIG. 4 shows a simple exemplary fuzzy-now function for an event.
Figure 5A:
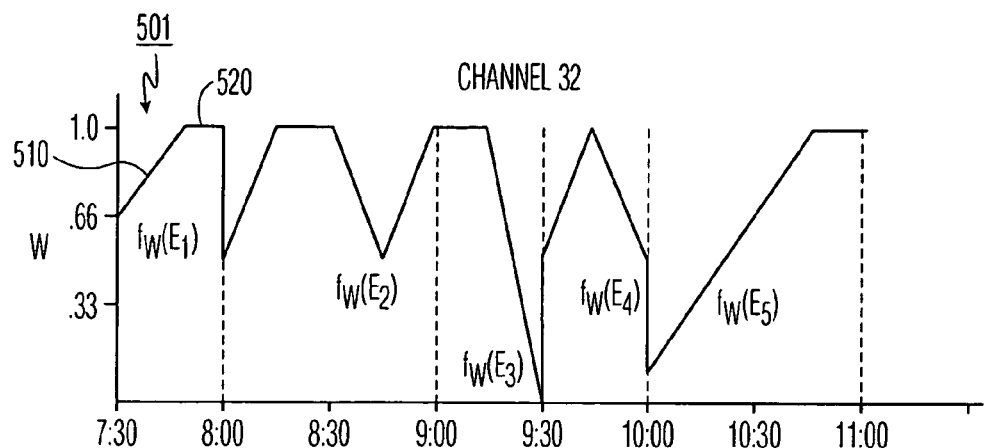
FIGS. 5A–5C are the fuzzy-now weighted functions for the same channels as FIGS. 3A–3C for the same particular time period.
Figure 5B:
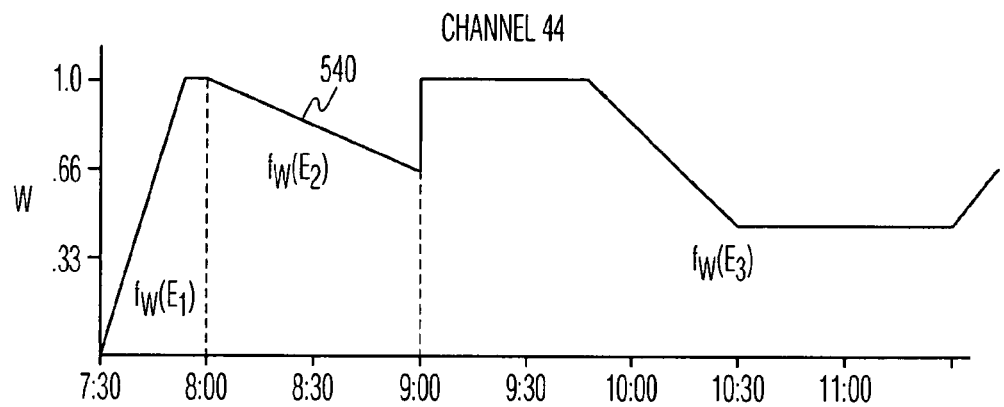
Figure 5C:
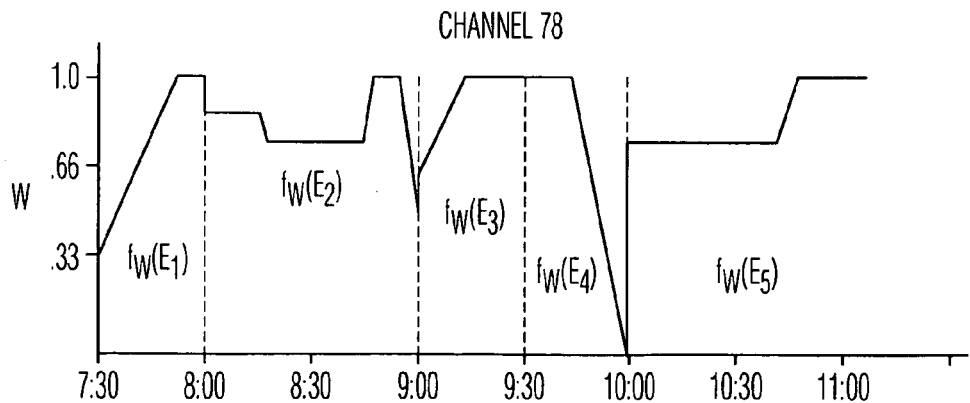
Figure 6A:
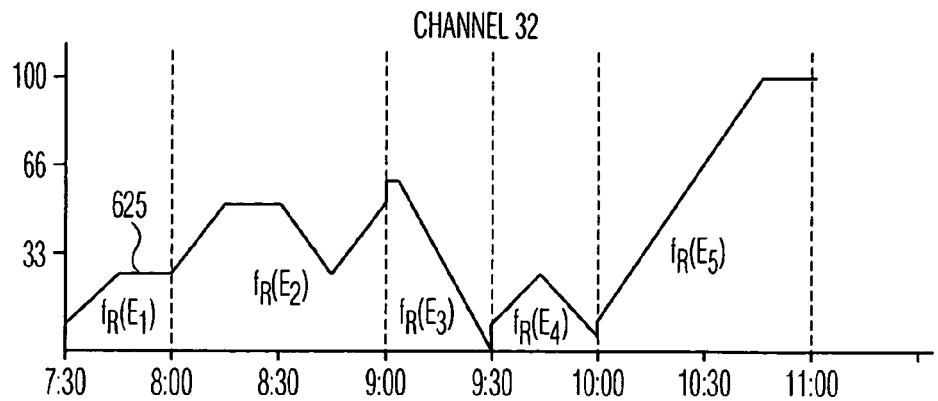
FIGS. 6A–6C are the final recommendation functions calculated by applying the weighted functions of FIGS. 5A–5C to the recommendation values of FIGS. 3A–3C.
Figure 6B:
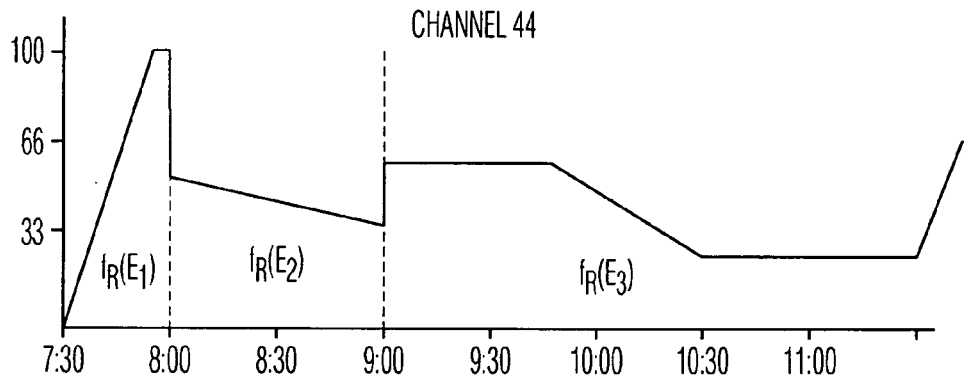
Figure 8A:
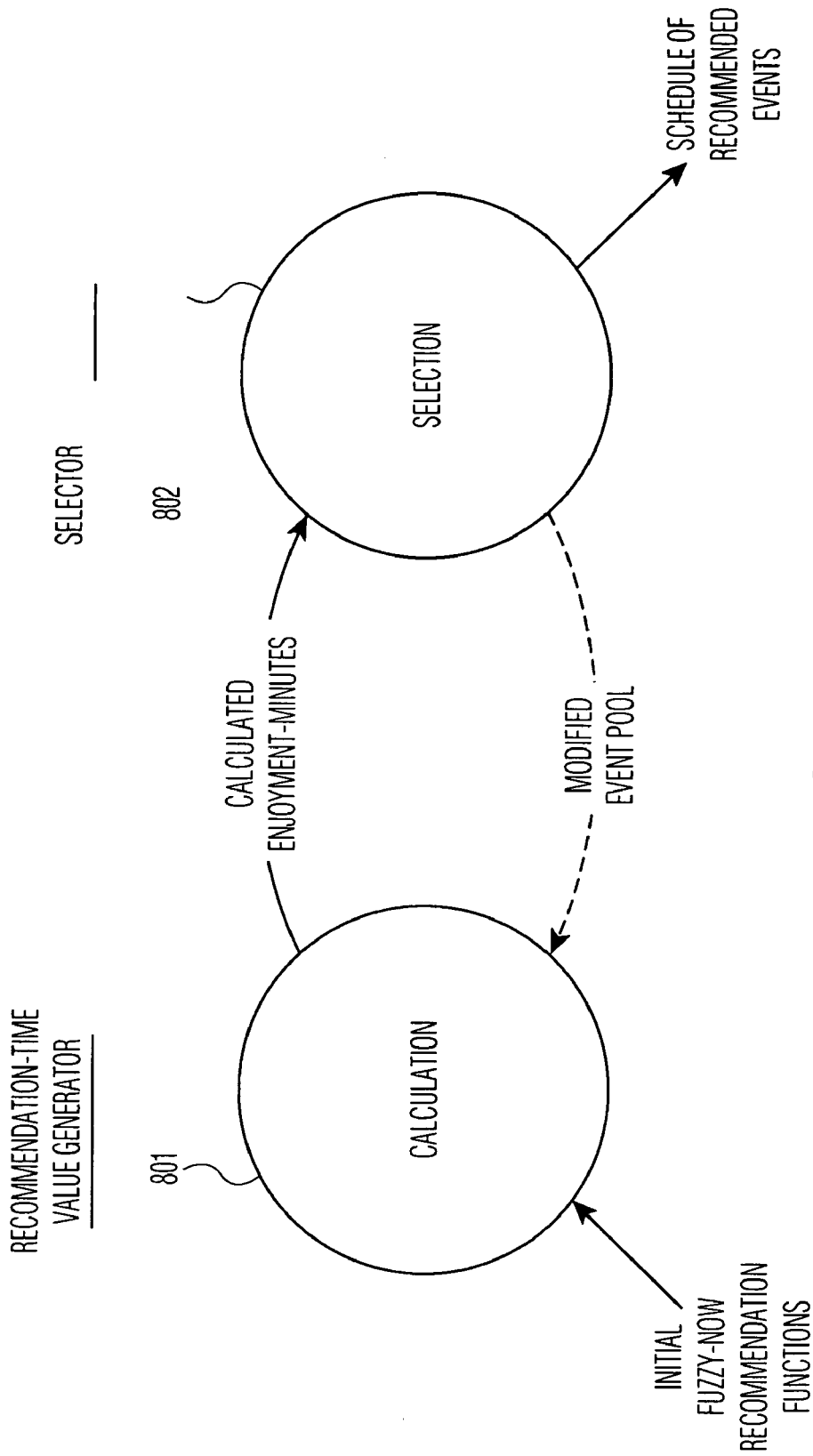
FIG. 8A shows a state diagram with the conceptual blocks that underlie the method according to the preferred embodiment of the present invention.
Figure 8B:
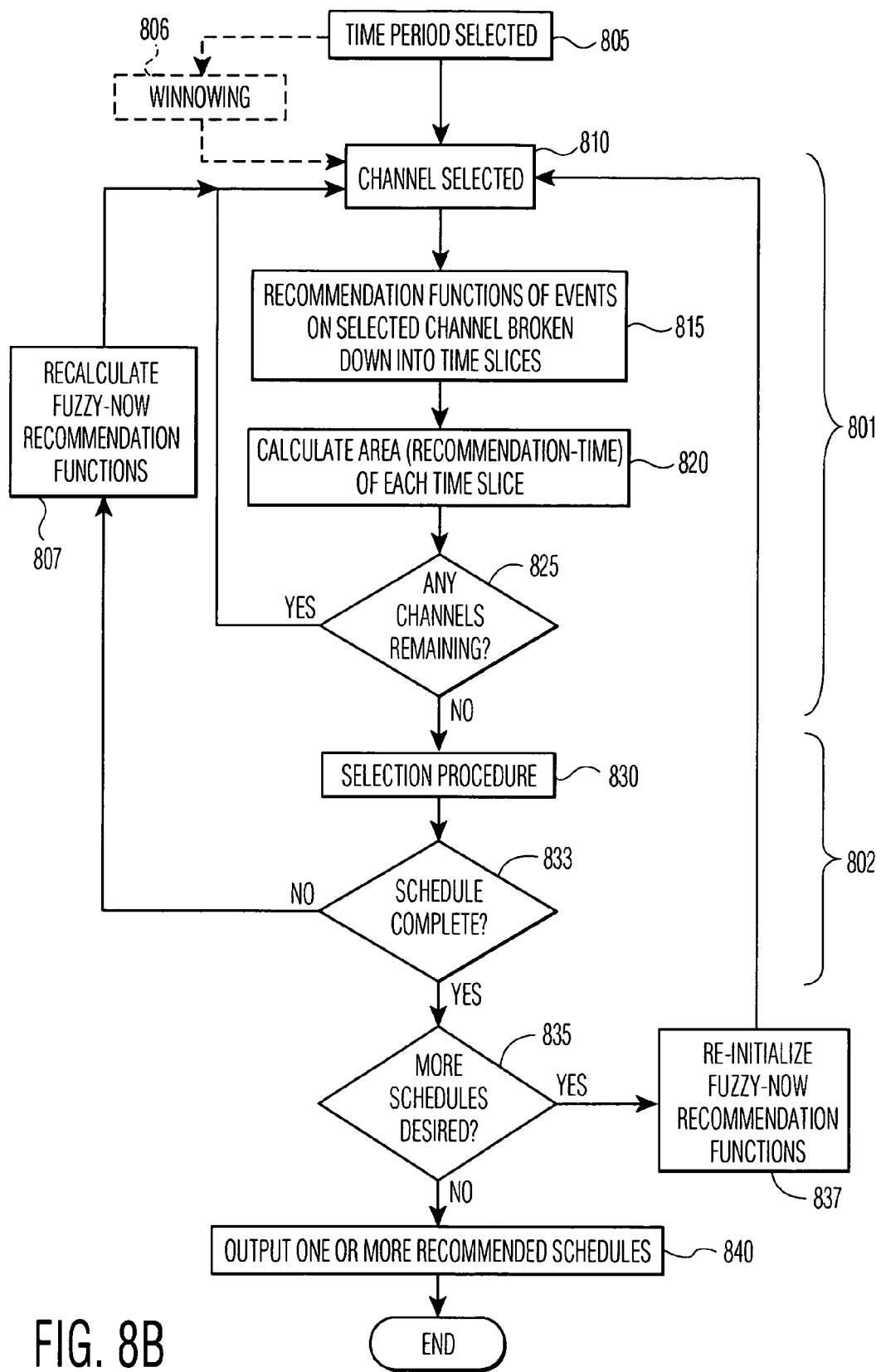
FIG. 8B is a flowchart of the steps involved in applying a preferred embodiment of the present invention to a group of channels such as are shown in FIGS. 6A–6C.
Figure 9:
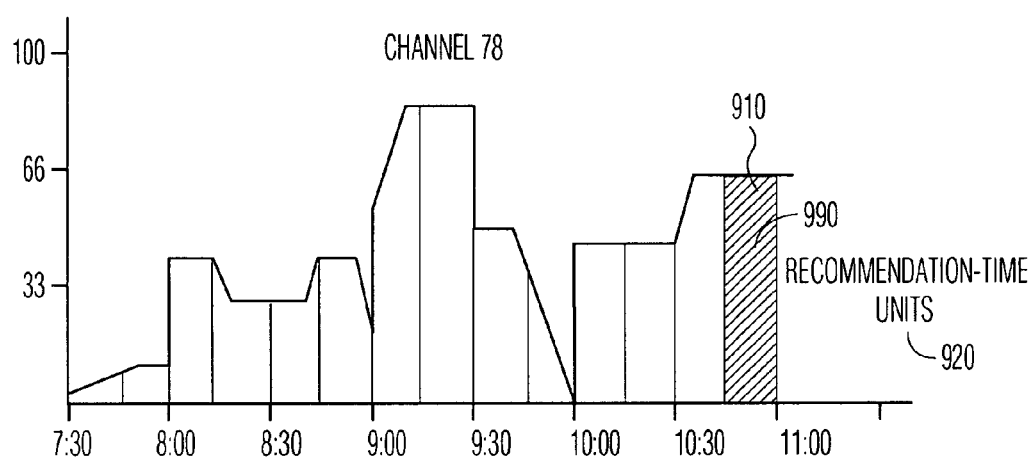
FIG. 9 shows the calculation of two-dimensional fuzzy-now recommendation values in units of recommendation-time, according to a preferred embodiment of the present invention.

Conceptually, the system and method of the presently preferred embodiment may be separated into two stages: a calculation stage 801 and a selection stage 802, as shown in the state diagram of FIG. 8A. These two stages can also be conceived as functional modules: a fuzzy-now recommendation-time value generator (801) and a selector (802) for selecting events and partial events to form a schedule. The calculation stage 801 takes initial input weighted recommendation functions $f_R(E_x)$ (such as FIGS. 6A–6C) and translates that data into preference-time units. To do so, the final weighted recommendation functions $f_R(E_x)$ are divided into time slices, and those time slices are measured in terms of the preference-time units, or "enjoyment-minutes". FIG. 9, which will be described in greater detail below with reference to FIG. 8B, shows the final recommendation functions $f_R(E_x)$ of FIG. 6C divided into time slices and indicates the area within a time slice 910 that is integrated to calculate the recommendation-time units for that particular time slice.

Returning to FIG. 8A, the time slice measurements, or enjoyment-minutes, calculated in calculation stage 801 are passed to selection stage 802. The selection stage 802 uses the time slice measurements to select one or more events for one or more schedules. In some embodiments, when the procedure reaches the selection stage 802 for the first time (e.g., the first iteration), only one event is selected. After that, the procedure returns to the calculation stage 801 and the fuzzy-now enjoyment-minutes are re-calculated; however, this recalculation is based on the changed circumstances after the selection iteration. An example of a changed circumstance, which will be explored more fully below, is the fact that an event may have been "clipped" by a previous selection iteration. In other words, when a particular event is selected for a particular time slot (e.g., 9 to 9:30 p.m.), a remaining event in an overlapping time slot (e.g., 9 to 10 p.m.) will be clipped by that selection. In some embodiments, the re-calculation stage takes this into account by reducing the fuzzy-now enjoyment-minute function for the clipped events. After re-calculating, the procedure returns to the selection stage 802 to select another event based on the re-calculated enjoyment-minutes. An example of this type of embodiment will be described with reference to FIG. 8B.

In other embodiments, the enjoyment-minute time slice values are only generated once. In other words, the calculation stage 801 is only performed once, and the selection stage 802 takes these first calculated values to create schedules. An example of this type of embodiment will be described with reference to FIG. 8C. The number of iterations of either the calculation stage 801 or the selection stage 802 is capable of a wide variety of permutations.

The selection stage 802 may use any selection algorithm for the task. The particular selection algorithm chosen may reflect assumptions about the user's viewing habits and preferences, as some exemplary selection methods that are described in greater detail below prove. The only criterion for the selection process is that it use the recommendation-time values calculated in the calculation stage in order to select one or more recommended schedules. For example, the selection process may use the total recommendation-time units per event in order to select recommended events in the selected time period. In contrast to such an event-based selection process, the selection process may use "enjoyment peaks", e.g., time slices with very high recommendation-time values, in order to select events and partial events for the recommended schedule. There are many possible selection algorithms to use, as is well-known to one skilled in the art.

In FIG. 8B, the broad steps shown in FIG. 8A are broken down into the specific steps of an embodiment where the calculation and selection steps are re-iterated. To generate a schedule of recommended events for a particular time period, a period of time (e.g., 7:30 p.m. to 11:00 p.m.) must first be selected in step 805. At this and other points in the procedure, a winnowing step 806 may be made in order to narrow down the number of channels and/or events on which the subsequent steps are performed. Such a step may be necessary in particular embodiments in order to reduce resource usage (for computing and processing) within the media entertainment system. Channels or events that the user has indicated a dislike for or events that do not reach a certain recommendation value threshold could be eliminated in such a step. Conceptually, such a winnowing step 806 is optional, so it is shown in dashed lines in FIG. 8B.

In steps 810–825, the recommendation-time units, or "enjoyment minutes" are calculated for each event on each particular channel. Steps 810–825 represent an exemplary method for calculating enjoyment-minutes, and it should be understood that other methods may be employed. In step 810, a channel is selected from the group of channels being analyzed. In step 815, the recommendation functions for the events on that channel in the selected period of time are broken down into smaller time slices. The granularity of the time slices may be set directly by the user, by the user's usage, or by the system itself. In the presently preferred embodiment, the time slices are 15 minutes long. Such granularity could be further qualified. For example, it may be preferred that some or all events are not broken down into time slices, or are broken down into time slices that vary in size.

Figure 6C:
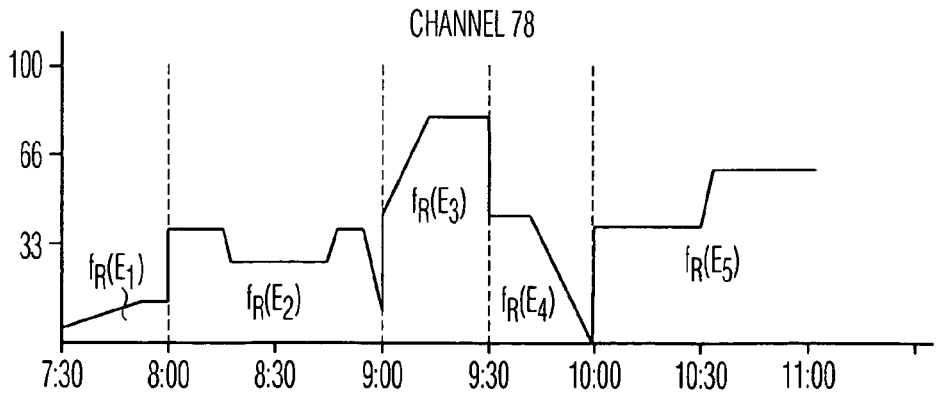

The result of performing step 815 on the channel 78 segment of FIG. 6C is shown in FIG. 9. The time period has been cut up into time slices of fifteen minutes, as shown by line 910, and the results of integrating those time slices are in units of preference-time, as shown by 920. Returning to the calculation loop, after breaking down the events in step 815, the area in each time slice is calculated and stored in step 820. Next, it is determined whether any channels remain to go through the calculation loop in step 825. If channels remain, steps 810 to 825 are repeated by selecting another channel in step 810. If the calculation stage 801 has been performed for all channels, all of the schedule data has been translated into preference-time units and, thusly, is ready for the first iteration of the selection procedure 830, which selects an event or partial event in order to create a schedule.

Once the selection procedure has selected an event or partial event in step 830, it is determined whether a completed schedule has been generated in step 833. If not, which would usually be the case after the first iteration, the fuzzy-now recommendation functions are re-calculated in step 807. In embodiments where multiple iterations of calculation/selection are performed, each iteration of re-calculation generates different results because the input to the calculation is modified by the results of the previous selection step. An example of this is described below with reference to FIG. 10A.

After the fuzzy-now recommendation function re-calculating step 807, the recommendation-time calculation steps 810–825 are performed on the results. Then another event or partial event is chosen in step 830. This repeats until it is determined, in step 833, that the schedule for the selected time period is completed. At that point, it is determined whether additional schedules are required in step 835. If so, the fuzzy-now recommendation functions are re-initialized at step 837 in order to repeat the process. This re-initializing may change the parameters in order to guarantee that the next resulting schedule will differ from the previous. For instance, if the event with the second highest overall enjoyment-minutes overlaps the event with the highest overall enjoyment-minutes, it is likely that this second highest event will not be selected for the first schedule. However, the first highest event may be eliminated, at step 837, from the pool of choices for the next schedule.

On the other hand, if it is determined, at step 835, that the desired number of schedules have been generated, those schedules are output in step 840 and the procedure ends.

Figure 8C:
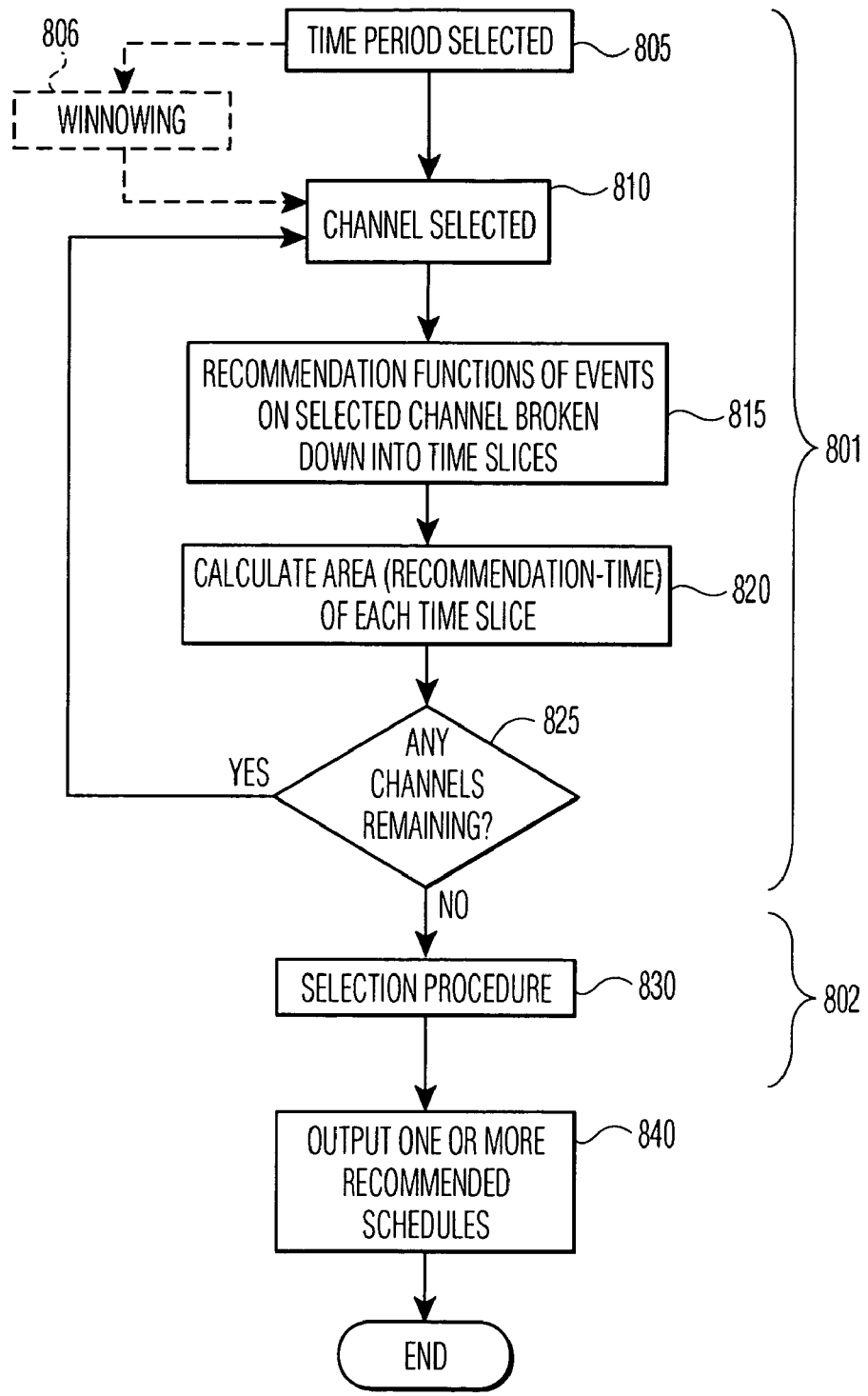
FIG. 8C is a flowchart of the steps involved in applying another preferred embodiment of the present invention to a group of channels such as are shown in FIGS. 6A–6C.

In FIG. 8C, the broad steps shown in FIG. 8A are broken down into the specific steps of an embodiment where the calculation and selection steps are not re-iterated. Specifically, the selection procedure 830 takes the results of recommendation-time calculation steps 810–825 and performs a series of steps in order to generate one or more schedules. Because only the initially calculated recommendation-time values are used, FIG. 8C does not need re-calculating step 807 or re-initializing step 837 of FIG. 8B. Furthermore, the determination of whether a schedule is complete, or whether the proper number of schedules have been generated (steps 833 and 835, respectively, of FIG. 8B), are performed as part of the selection process itself and, thus, do not appear in FIG. 8C.

As is known to one skilled in the art, the steps in FIGS. 8B and 8C may be performed in a different order to achieve the same calculation results. Furthermore, although channels are used as the iteration index in steps 810–825, different indices may be used for iteration. Further still, nested loops with different indices could be used. There are a myriad of procedures that may be performed in order to translate the weighted recommendation values into preference-time units, as is well-known in the art.

Figure 8D:
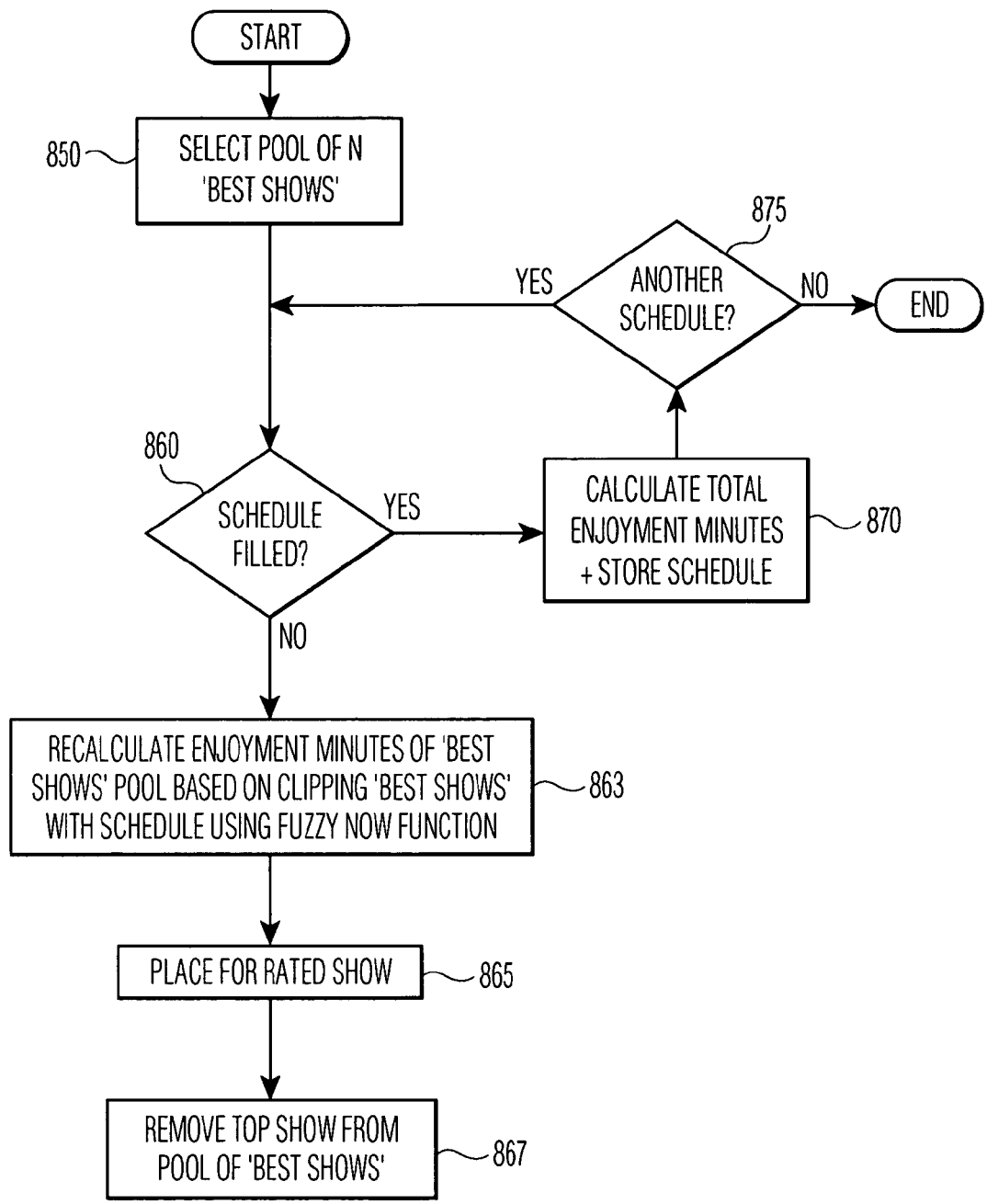
FIG. 8D is a flowchart of the steps involved in applying yet another preferred embodiment of the present invention to a group of channels such as are shown in FIGS. 6A–6C.

In FIG. 8D, the broad steps shown in FIG. 8A are broken down into the specific steps of another embodiment where the calculation and selection steps are re-iterated. In step 850, a winnowing step is performed, where a pool of the highest rated events is selected. In this case, the number of selected shows, N, is equal to the number of possible slots multiplied by a constant, i.e., 10 (N=#slots*10). The possible slots may use any unit; however, the preferred unit is each half-hour slot, as this is what is used as the base unit in most broadcasting mediums (e.g., in the time period from 8 a.m. to noon, there are 8 slots). After the pool of N events is selected in step 850, a selection and calculation loop is performed in steps 860 through 867. In step 860, it is determined whether the specified schedule is filled. If it is not, the enjoyment-minutes of each event remaining in the pool of events is re-calculated in step 863. This re-calculation is performed on the basis that events clipped in the previous selection iteration will have a diminished fuzzy-now recommendation function. An event that is completely overlapped by a previously selected event will have a value of zero.

Having re-calculated the enjoyment-minutes in step 863, the top-rated show (i.e., the event with the highest enjoyment-minutes) is selected in step 865. Once selected, the top-rated event is removed from the pool of events in step 867. Now, the loop returns to step 860 in order to determine whether the schedule has been filled. If it has not, the loop returns. If the schedule is filled in step 860, the total enjoyment-minutes for the entire selected schedule is calculated and stored with the selected schedule in step 870. At step 875, it is determined whether another schedule should be created. If so, the loop of steps 860–867 are re-iterated until another schedule is generated. It should be noted that the events previously eliminated from the pool of events in step 867 while forming the previous schedule remain removed from the pool when generating the next schedule. This guarantees an interesting and non-overlapping series of schedules.

Figure 10A:
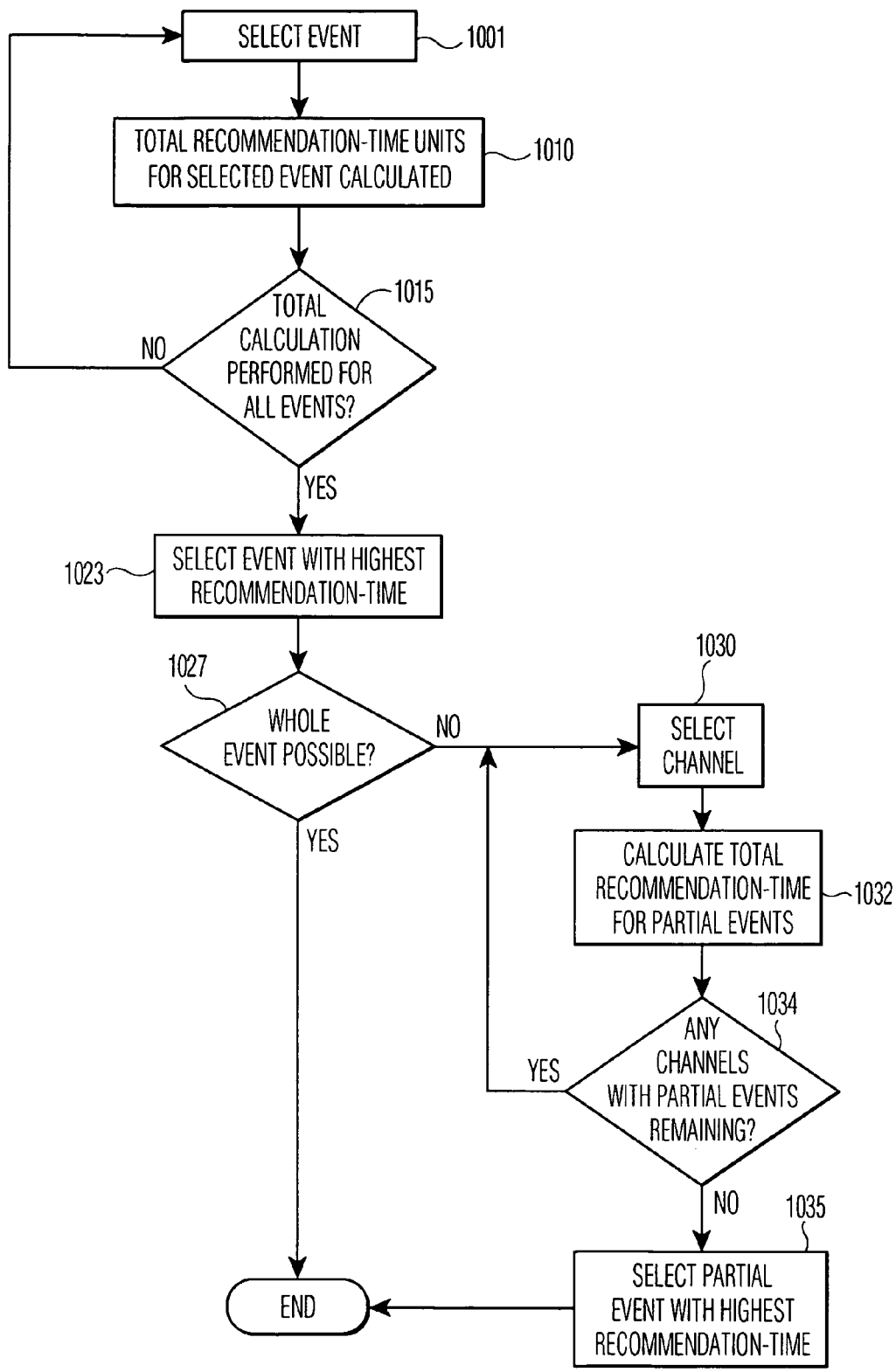
FIG. 10A shows the steps involved in an exemplary selection procedure, according to the preferred embodiment of FIG. 8B.
Figure 10B:
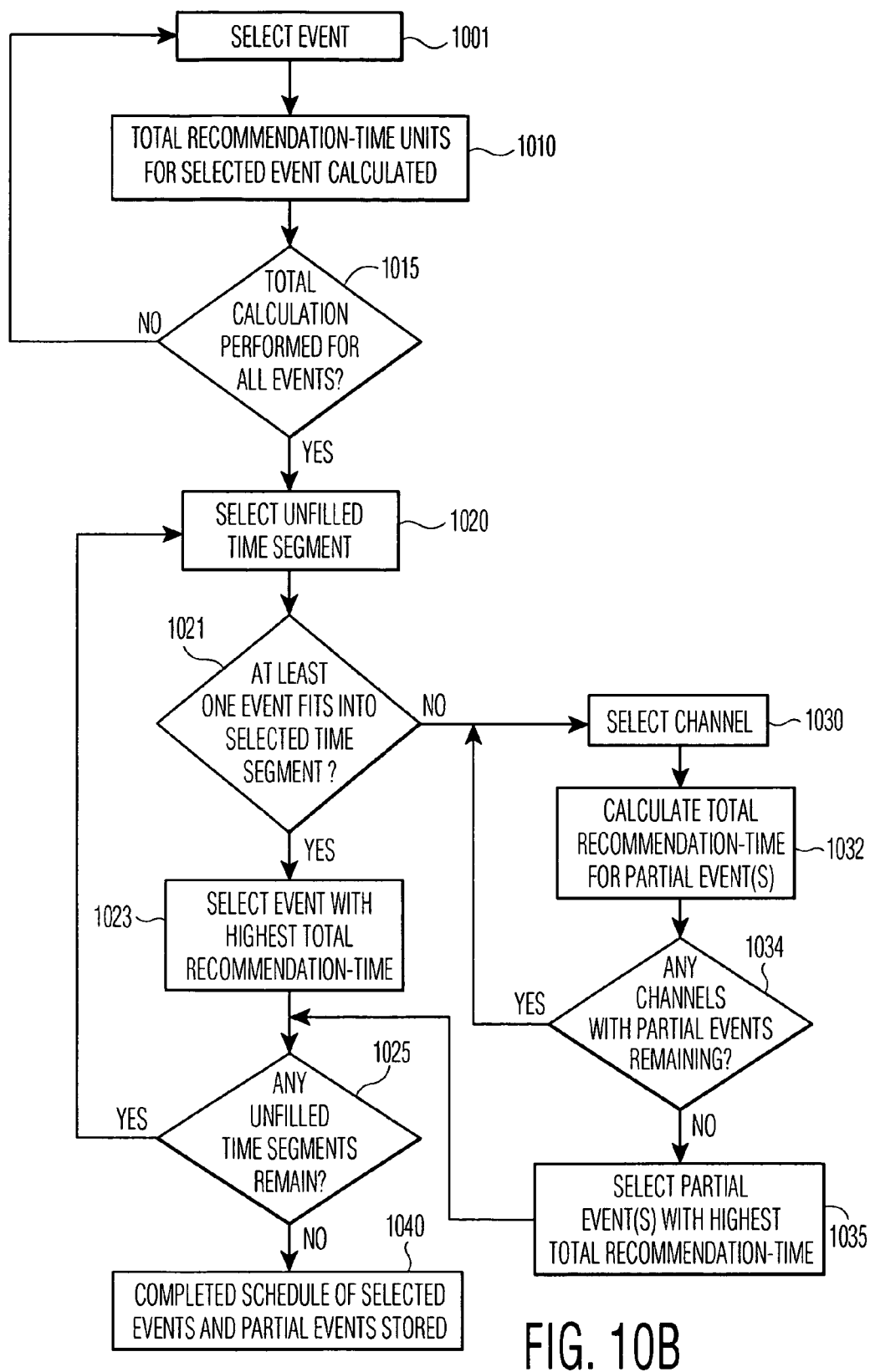
FIG. 10B shows the steps involved in an exemplary selection procedure, according to the preferred embodiment of FIG. 8C.

As mentioned above, selection procedure 802 (830 in FIGS. 8B and 8C) may be performed in many different ways. Below, two examples of selection procedures are described with reference to FIGS. 10A and 10B. FIG. 10A shows a selection procedure that would be used in a FIG. 8B embodiment, where the calculation and selection steps are re-iterated. FIG. 10B shows a selection procedure that would be performed in a FIG. 8C embodiment, where the calculation stage 801 is not repeated.

In FIG. 10A, the selection procedure 830 begins with a loop, in steps 1001 to 1010, for adding up the total enjoyment minutes for each event. In step 1001, an event is selected. In step 1010, the enjoyment minutes in each time slice that comprises the selected event are added up for an event enjoyment minute total. In step 1015, it is determined whether all events in the selected time period have been totalled. If not, the loop starts back at step 1001. Some events may have been divided by the selected time period, in which case only a partial event is within the selected time period. For purposes of the above loop, these are treated as whole events.

If all events have been totalled in loop steps 1001–1015, the procedure continues with the selection step 1023. In step 1023 of FIG. 10A, the event with the highest total recommendation-time is selected. It does not matter when this event occurs, it is merely the highest one. If it is determined that the selection of a whole event is not possible in step 1027, a partial event with the highest recommendation-time is selected in steps 1030–1035. In step 1030, a partial event or partial events on a particular channel within the unfilled time period is/are selected. This means the time slices of a channel within the selected unfilled time period are selected, regardless of whether they belong to two different events. The total enjoyment minutes for the selected partial event(s) are calculated in step 1032. In step 1034, it is determined whether the partial event(s) on any channel within the selected (in step 1020) unfilled time period has not been totalled. If there is a remaining channel with untotalled partial event(s), the process loops back to step 1030. If there is no remaining channel with untotalled partial event(s) in step 1034, the partial event(s) with the highest enjoyment minute total is selected. Two or more non-overlapping partial events may be selected in step 1035.

After either a whole event is selected in step 1027 or a partial event is selected in step 1035, the selection procedure ceases and the method returns to FIG. 8B. Continuing on in FIG. 8B, if it is determined the schedule is not completed in step 833, the fuzzy-now recommendation values are re-calculated in step 807. In this particular embodiment, the re-calculation is performed with an additional weighting factor; specifically, all events that overlap in time with the previously selected event(s) are diminished by a weighting factor of 0.1. This weighting is to factor in the fact that the enjoyment of an event is diminished when only part of it can be seen. After re-calculation step 807 is performed, the recommendation-time calculation steps 810–825 are performed on the re-calculated recommendation functions produced in step 807. Then, the selection procedure of FIG. 10A is repeated again. The loop repeats until the desired number of schedules is generated.

In FIG. 10B, a selection procedure that would be performed in a FIG. 8C embodiment is shown. Like FIG. 10A, the selection procedure of FIG. 10B begins with the loop of steps 1001–1010, where the total enjoyment minutes for each event are calculated. After that, an unfilled time period is selected in step 1020. For the first iteration, the unfilled time period would comprise the entire selected time period. This selecting step is required in FIG. 10B, because, unlike FIG. 10A, the focus of the selection procedure is to fill the entire schedule. For example, when looping back to step 1020, two events may have been previously selected, which could result in three unfilled time segments (between the start and the first event, between the first and the second event, and between the second event and the end). One of these unfilled segments must be chosen before continuing. After selecting an unfilled time segment in step 1020, it is determined whether one or more events fit within the selected time segment in step 1021. If they do, the event in the selected time period with the highest total enjoyment minutes is selected at step 1023. At step 1025, it is determined whether any time segments without a selected event or partial event remain in the originally selected time period. If they do, the loop starts again back at step 1020.

If it is determined that an event does not fit within the selected unfilled time segment in step 1021, the procedure jumps to a partial event selection loop starting at step 1030. At this point, the procedure continues at step 1025. If no more time segments without a selected event or partial event remain in the originally selected time period in step 1025, a finished schedule consisting of selected events and partial events for the originally selected time period is stored at step 1040.

Although both FIGS. 10A and 10B begin by calculating the recommendation-time value for each event (in steps 1001–1015), that is not necessarily so in other selection procedures. During the steps in FIGS. 10A and 10B, various selection and calculation results will need to be stored; however, the storing steps are not shown because they are unnecessary for understanding the procedure. In addition, the storing steps would be assumed by one skilled in the art.

Figure 11:
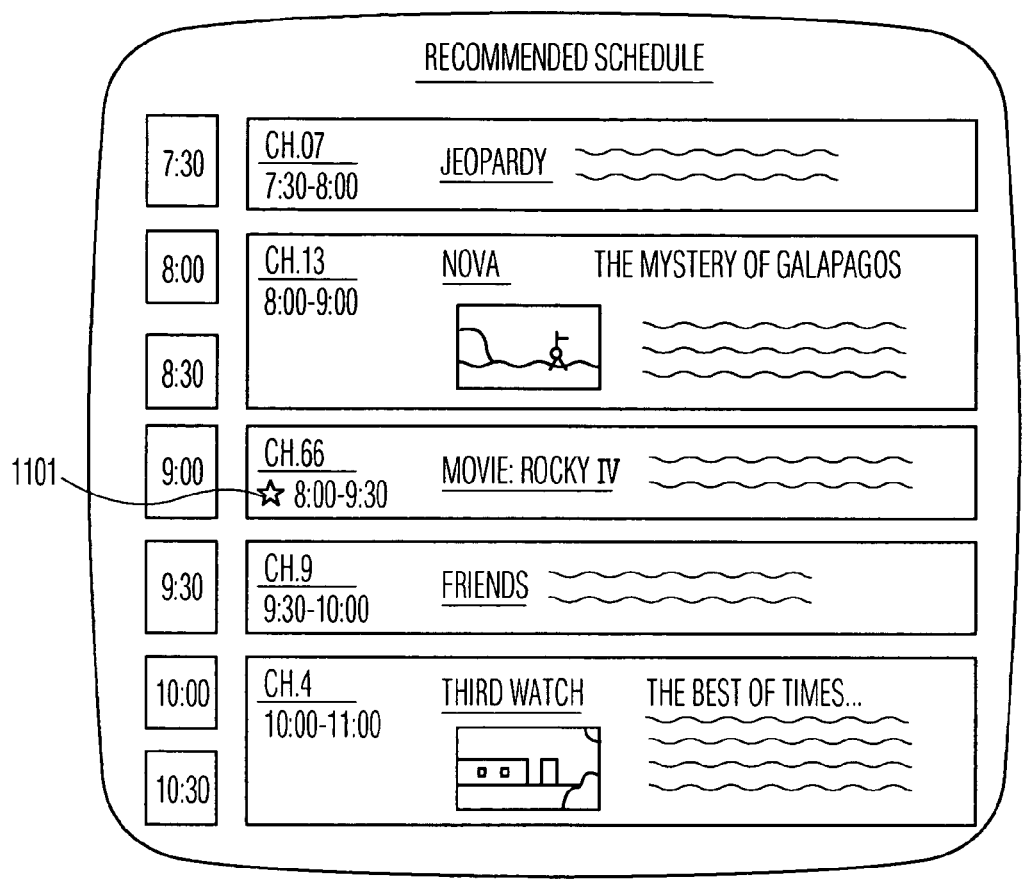
FIG. 11 shows an exemplary EPG screen showing a recommended schedule for a specified period of time, according to a preferred embodiment of the present invention.

A single schedule of selected recommended events and partial events as it might appear in an EPG GUI is shown in FIG. 11. A star 1101 is used to inform the user that a partial event is being recommended. If more than one schedule is desired, the procedure would first eliminate the event with the highest enjoyment minutes in the stored schedule(s) from consideration, and then restart the loop at step 1001. In other words, this event would not be considered in the different selection steps that are performed from that point on. Such a method of generating multiple schedules would result in a first schedule with the highest totalled event as an anchor, a second schedule with the second highest totalled event as an anchor, etc.

As stated above, the selection procedure shown in FIG. 10 is merely exemplary, and a wide variety of selection methods could be used. As an additional example, a slice time threshold could be set, and the time slices above that threshold during the selected time period would be selected. Then, a ratio of selected (above threshold) time slices to unselected (below threshold) time slices would be calculated for each event having a selected time slice. The events with the highest ratios would be chosen to form a schedule. This method would put a higher priority on peaks of enjoyment over overall event enjoyment totals. Another selection procedure could be based on the user's channel surfing habits. If the user is indifferent to switching channels every half hour (whether or not it interrupts one or both events), then a method selecting the highest event or partial event during each half-hour of the selected time period could be used. This method may or may not result in channel switches every half hour. If the user desires to switch channels every half hour, the method would choose half-hour events or half-hour partial events that have no contiguous selected half-hours on the same channel. Furthermore, a more randomized selection method might be used in order to generate numerous schedules. For example, the enjoyment minutes of the second time slice in each event might be chosen as the unit for comparing events rather than the total enjoyment minutes of each event. These examples barely brush the surface of what selection methods could be implemented when using the enjoyment minute as the basis for comparison or selection.

Furthermore, certain trump rules or global rules may be applied to the generation of schedules. For example, for the methods of FIGS. 10A and 10B, a rule might be applied that a certain event never follow a certain other event, regardless of the enjoyment minute totals for those two events. This type of extraneous rule could be implemented by adding additional steps.

In addition, the user may change or switch events as chosen according to embodiments of the present invention. As an example, in FIG. 12, a series of three schedules, which have been generated using the preferred embodiment of FIG. 8D, are displayed in a EPG. Because the preferred embodiment of FIG. 8D was used, each schedule has its own unique events. The schedules are in the time period from 7:30 p.m. to 11:30 p.m. The schedule with the most enjoyment-minutes, Schedule #1 1201, is shown at the top, while the second-highest, Schedule #2 1202, and the third-highest, Schedule #3 1203, are shown below. Using the steps shown in FIG. 13, the user may change the most preferred schedule, Schedule #1 1201, to one more of his or her liking.

Figure 12:
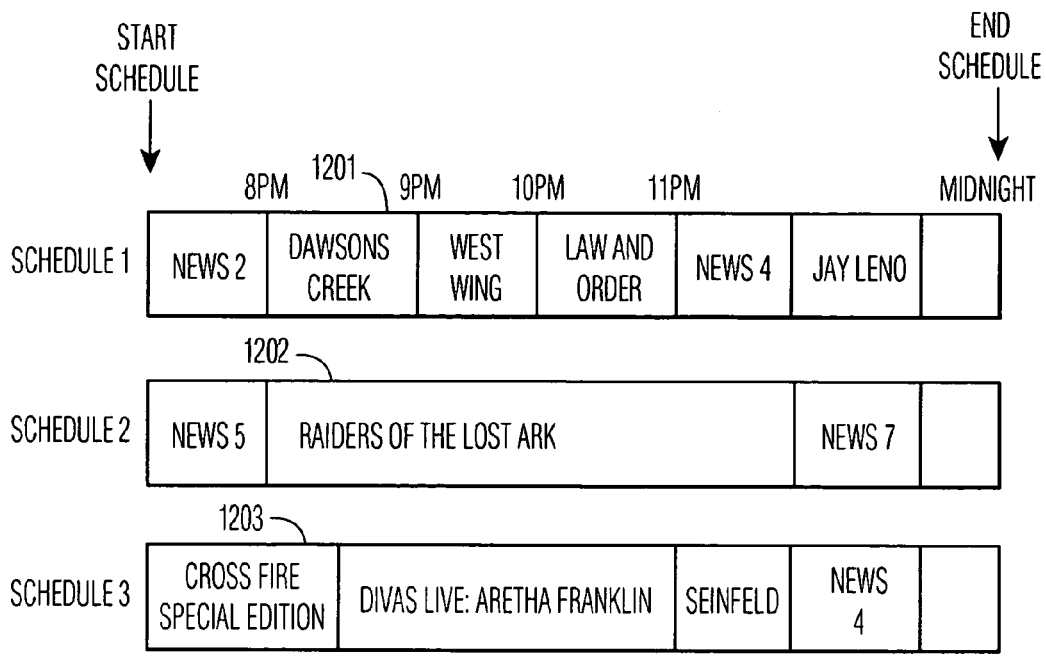
FIG. 12 shows an exemplary EPG screen showing three recommended schedules for a specified period of time, according to another preferred embodiment of the present invention.
Figure 13:
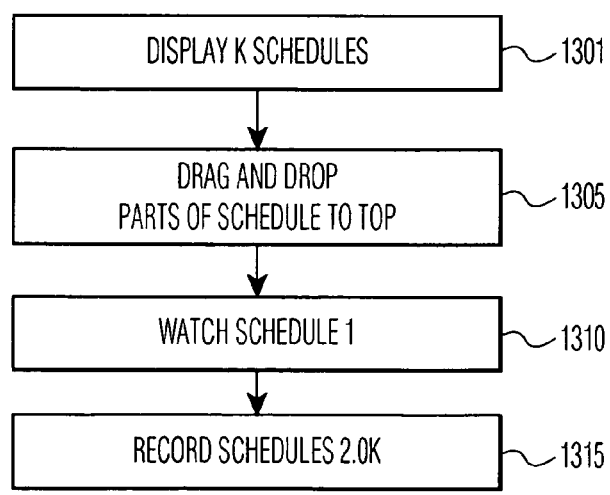
FIG. 13 is a flowchart of the steps employed by a user to manipulate the recommended events, according to a preferred embodiment of the present invention.

Starting with step 1301 in FIG. 13, the K generated schedules are displayed to the user, as for example the three generated schedules are shown in FIG. 12. Next, in step 1305, the user may select an event from one of the other schedules (e.g., the Channel 5 News at 7:30 p.m. in Schedule #2 1202) and move it to replace an event in the most preferred schedule (e.g., the Channel 2 News in Schedule #1 1201). Using this "drag and drop" procedure of step 1305, the user may build any sort of schedule he or she wishes. In addition, while watching the chosen schedule in step 1310, one or more of the other schedules may be recorded in step 1315. This functionality may be implemented by any number of means, including a VCR or the TiVo system.

By measuring events, partial events, and time slices using two-dimensional preference-time units, embodiments according to the present invention take into account how the user's preference changes over time so that more enjoyable and flexible recommended schedules of media events may be generated.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for recommending a schedule of events to a user, wherein an event is a discrete item of media presentation, said schedule starting at a start time and ending at an end time, comprising:

at least one fuzzy-now recommendation system for generating a fuzzy-now recommendation function for each event in a plurality of event schedules, each of said event schedules being at least one of an event and a partial event presented on a channel from the start time to the end time;

a fuzzy-now recommendation-time value generator for dividing each generated fuzzy-now recommendation function into time slices, and for calculating a cumulative fuzzy-now recommendation-time value for each time slice, said fuzzy-now recommendation value being comprised of units of recommendation-time; and a selector for selecting a series of at least one of an event and a partial event to comprise a schedule of recommended events, said selecting being based upon the calculated fuzzy-now recommendation-time values including a highest ratio of time slices above a given threshold to time slices below the given threshold for each event.

2. The apparatus as recited in claim 1, further comprising:

a scheduling information source for providing a plurality of event schedules to the at least one fuzzy-now recommendation system;

at least one media source for supplying at least one of an event and a partial event in the provided plurality of event schedules;

a receiver/tuner for tuning in a channel, for receiving at least one of an event and a partial event over the tuned channel from the at least one media source, and for providing the received at least one of an event and a partial event to a media output means ;

said media output means for receiving at least one of an event and a partial event from the receiver/tuner and presenting said at least one of an event and a partial event to a user;

a controller for directing the receiver/tuner, for directing the reception of the plurality of event schedules from the scheduling information source, and for directing the creation of an Electronic Programming Guide (EPG) Graphical User Interface (GUI) which will be provided to an EPG GUI output means, said EPG GUI being created from the plurality of event schedules; and an EPG GUI Output means;

wherein the selected schedule of recommended events is output to the EPG GUI output means.

3. The apparatus as recited in claim 1, further comprising:

a user profile storage for storing a user profile, said user profile comprising recommendation values and fuzzy-now functions for channel events, wherein the at least one fuzzy-now recommendation system generates a fuzzy-now recommendation function for each event by applying a fuzzy-now function for said each event in the uset profile to a recommendation value for said each event in the user profile.

4. The apparatus as recited in claim 2, further comprising:

an input means for a user to control the EPG GUI and to select the start and end times of the recommended schedule.

5. The apparatus as recited in claim 2, wherein the EPG GUI output means and the media output means are the same means.

6. The apparatus as recited in claim 2, wherein the at least one media source is one of CATV system, an RF broadcast television system, the Internet, and a storage/playback device.

7. The apparatus as recited in claim 2, wherein the receiver/tuner is one of a stereo AM/FM radio receiver, a digital radio receiver, a television UHF/VHF receiver, a digital television receiver, a set-top box (STB), and a web browser.

8. The apparatus as recited in claim 2, wherein the media output means is one of a television monitor, a stereo speaker system, a holographic display, a screen on a PDA, and a screen on a mobile terminal.

9. The apparatus as recited in claim 1, wherein the time slices are one of equal size and varying sizes.

10. The apparatus as recited in claim 1, wherein the time slices correspond in size to events.

11. A method of generating a schedule of recommended events, wherein an event is a discrete item of media presentation, said schedule starting at a start time and ending at an end time, comprising the steps of:

receiving a plurality of event schedules, each of said event schedules being at least one of an event and a partial event presented on a channel;

generating a fuzzy-now recommendation function for each at least one of an event and a partial event in the received plurality of event schedules to create a series of at least one fuzzy-now recommendation function for each channel;

dividing at least a portion of each series of at least one generated fuzzy-now recommendation function into time slices, said at least a portion being from the start time to the end time;

calculating a fuzzy-now recommendation-time value for each time slice, said fuzzy-now recommendation-time value being comprised of units of recommendation-time; and selecting a series of at least one of an event and a partial event to comprise a schedule of recommended events, said selecting being based upon the calculated fuzzy-now recommendation-time values including a highest ratio of time slices above a given threshold to time slices below the given threshold for each event.

12. The method as recited in claim 11, wherein the step of calculating a fuzzy-now recommendation-time value for each time slice comprises:

mathematically integrating the generated fuzzy-now recommendation function over each time slice.

13. The method as recited in claim 11, wherein the step of generating a fuzzy-now recommendation function for each at least one of an event and a partial event in the received plurality of event schedules comprises:

receiving a recommendation value for an event;

receiving a fuzzy-now function for the event; and applying the fuzzy-now function of the event to the recommendation value of the event, thus senerat ins a fuzzy-now recommendation function for the event.

14. The method as recited in claim 11, wherein the step of selecting a series of at least one of an event and a partial event to comprise a schedule of recommended events is based upon events with a highest total recommendation-time.

15. The method as recited in claim 14, wherein the step of selecting a series of at least one of an event and a partial event to comprise a schedule of recommended events comprises;

calculating a total fuzzy-now recommendation-time for each event and partial event within the start time and end time, said calculating being the addition of time slices comprising each event and partial event;

selecting, within the start time and end time, at least one of an event and partial event with a highest total fuzzy-now recommendation-time for its own time period in order to fill its own time period;

repeating the selecting step for any unfilled time period within the start time and end time, until a period from the start time to the end time is completely filled with at least a selected non-overlapping one of an event and a partial event; and creating a schedule of recommended events with the at least a selected non-overlapping one of an event and a partial event.

16. The method as recited in claim 14, wherein the step of selecting a series of at least one of an event and a partial event to comprise a schedule of recommended events comprises:

(a) calculating a total fuzzy-now recommendation-time for each event and partial event within the start time and end time, said calculating being the addition of time slices comprising each event and partial event;

(b) selecting, within the start time and end time, one of an event and partial event with a highest total fuzzy-now recommendation-time;

(c) removing the selected event from a pool of events comprising all events and partial events in the plurality of event schedules;

(d) repeating the generating, dividing, and calculating a fuzzy-now recommendation-time value for the pooi of events, wherein, in the repeated generating step, a fuzzy-now recommendation function for events that overlap in time the selected event is diminished by a weighting factor;

(e) repeating steps (a), (b), (c), and (d) until a period from the start time to the end time is completely filled with at least a selected non-overlapping one of an event and a partial event; and (f) creating a schedule of recommended events with the at least a selected non-overlapping one of an event and a partial event.

17. The method as recited in claim 11, wherein the step of selecting a series of at least one of an event and a partial event to comprise a schedule of recommended events is based upon time slices with a highest total recommendation-time.

18. The method as recited in claim 17, wherein the step of selecting a series of at least one of an event and a partial event to comprise a schedule of recommended events comprises:

finding each event that has at least one time slice with a recommendation-time value above the given threshold;

calculating the ratio of time slices above the given threshold to time slices below the given threshold for each found event;

selecting, within the start time and end time, an event with a highest calculated ratio for its own time period in order to fill its own time period;

repeating the selecting step until a period from the start time to the end time is filled as it can be with whole events;

calculating, if there are any unfilled time segments between the start time and end time, a ratio of time slices above the given threshold to time slices below the given threshold for each partial event in each unfilled time segment within the period from the start time to the end time;

selecting, within the start time and end time, a partial event with a highest calculated ratio for its own time period to fill its own time period;

repeating the selecting step until a period from the start time to the end time is filled;

creating a schedule of recommended events with the at least a selected non-overlapping one of an event and a partial event.

19. The method as recited in claim 11, wherein the step of selecting a series of at least one of an event and a partial event to comprise a schedule of recommended events is based upon channel-surfing habits of a user.

20. The method as recited in claim 19, wherein the step of selecting a series of at least one of an event and a partial event to comprise a schedule of recommended events comprises:

determining a multiple of time slices based on an amount of time the user watches a channel event before switching to another channel event;

dividing each series of time slices into divisions, each division being comprised of one determined multiple of time slices;

calculating a fuzzy-now recommendation-time value for each division;

selecting, within the start time and end time, non-overlapping divisions with a highest calculated ratio for their own time period to fill their own time period, until a period between the start time and end time is filled;

creating a schedule of recommended events with the selected non-overlapping divisions.

21. The apparatus as recited in claim 11, wherein the time slices are one of equal size and varying sizes.

22. The apparatus as recited in claim 11, wherein the time slices correspond in size to events.

23. An apparatus for recommending a schedule of events to a user comprising:

a generator configured to divide said events into time slices, and to calculate a highest ratio of said time slices above a given threshold to said time slices below said given threshold for each of said events; and a selector configured to select said events starting from said highest ratio, wherein said generator configured to calculate, if there are unfilled time segments between a start time and an end time of said schedule, a further ratio of further time slices above the given threshold to further time slices below the given threshold for each partial event in each of said unfilled time segments.

* * * * *